(12) United States Patent
Vitanza

(10) Patent No.: US 8,453,895 B2
(45) Date of Patent: Jun. 4, 2013

(54) REAR-MOUNTED BIKE RACK FOR SUPPORTING GROCERY BAGS AND SIMILAR ITEMS

(76) Inventor: John A. Vitanza, Los Angeles, CA (US)

( * ) Notice: Subject to any disclaimer, the term of this patent is extended or adjusted under 35 U.S.C. 154(b) by 688 days.

(21) Appl. No.: 12/592,956

(22) Filed: Dec. 7, 2009

(65) Prior Publication Data

US 2011/0132949 A1    Jun. 9, 2011

(51) Int. Cl.
*B62J 7/04* (2006.01)
(52) U.S. Cl.
USPC ............ 224/454; 224/422; 224/431; 224/925
(58) Field of Classification Search
USPC ................. 224/412, 422, 423, 428, 429, 431, 224/440, 451, 452, 453, 454, 925, 42.3, 2, 224/430, 42.11, 432, 498, 499; 248/95; 220/4.28, 4.29; 16/366
See application file for complete search history.

(56) References Cited

U.S. PATENT DOCUMENTS

| | | | | | |
|---|---|---|---|---|---|
| 582,229 | A | * | 5/1897 | Reynolds | 224/432 |
| 605,188 | A | * | 6/1898 | Rondell | 224/444 |
| 2,675,151 | A | * | 4/1954 | Earl | 224/432 |
| 4,364,497 | A | * | 12/1982 | Zimmerli | 224/454 |
| 5,205,142 | A | * | 4/1993 | Kruger et al. | 70/16 |
| 5,845,951 | A | * | 12/1998 | Webb | 294/159 |
| 6,367,746 | B1 | * | 4/2002 | Webb et al. | 248/95 |
| 6,843,396 | B2 | * | 1/2005 | Champagne | 224/422 |
| 6,991,204 | B2 | * | 1/2006 | Ay | 248/308 |
| 2006/0138185 | A1 | * | 6/2006 | Lien et al. | 224/427 |
| 2010/0327034 | A1 | * | 12/2010 | Hajiani | 224/441 |
| 2011/0272371 | A1 | * | 11/2011 | Pettifer | 211/85.15 |

* cited by examiner

Primary Examiner — Justin Larson
(74) Attorney, Agent, or Firm — Colin P. Abrahams

(57) ABSTRACT

The rear-mounted bike rack has a platform on which an upright post is pivotable to a stored position. The handles of grocery bags can be engaged on the post. The bike rack has skirts which hang down outside the wheel to prevent the grocery bags from engaging on the rear wheel of the bicycle. The skirts can be folded up onto the platform when not needed. An optional carrier box can be mounted on the platform.

19 Claims, 4 Drawing Sheets

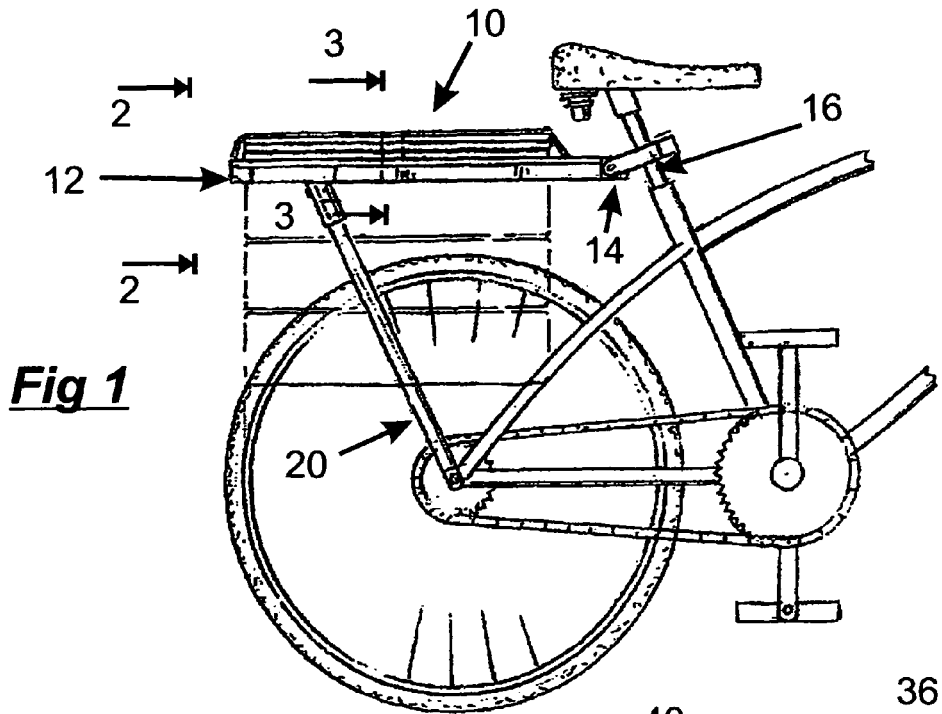
*Fig 1*
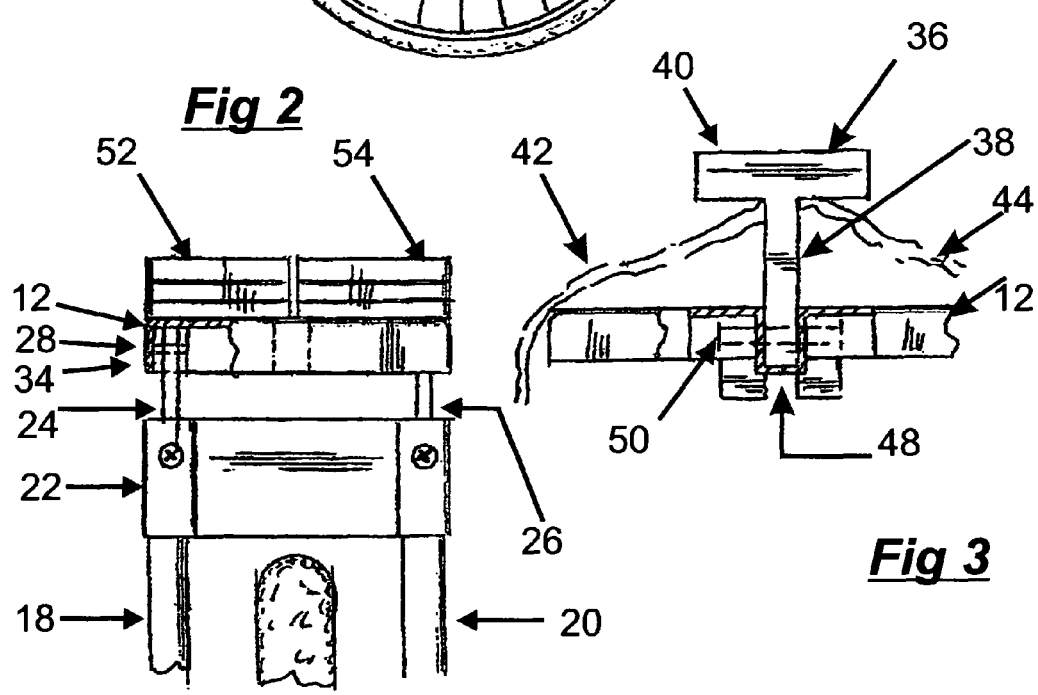
*Fig 2*
*Fig 3*

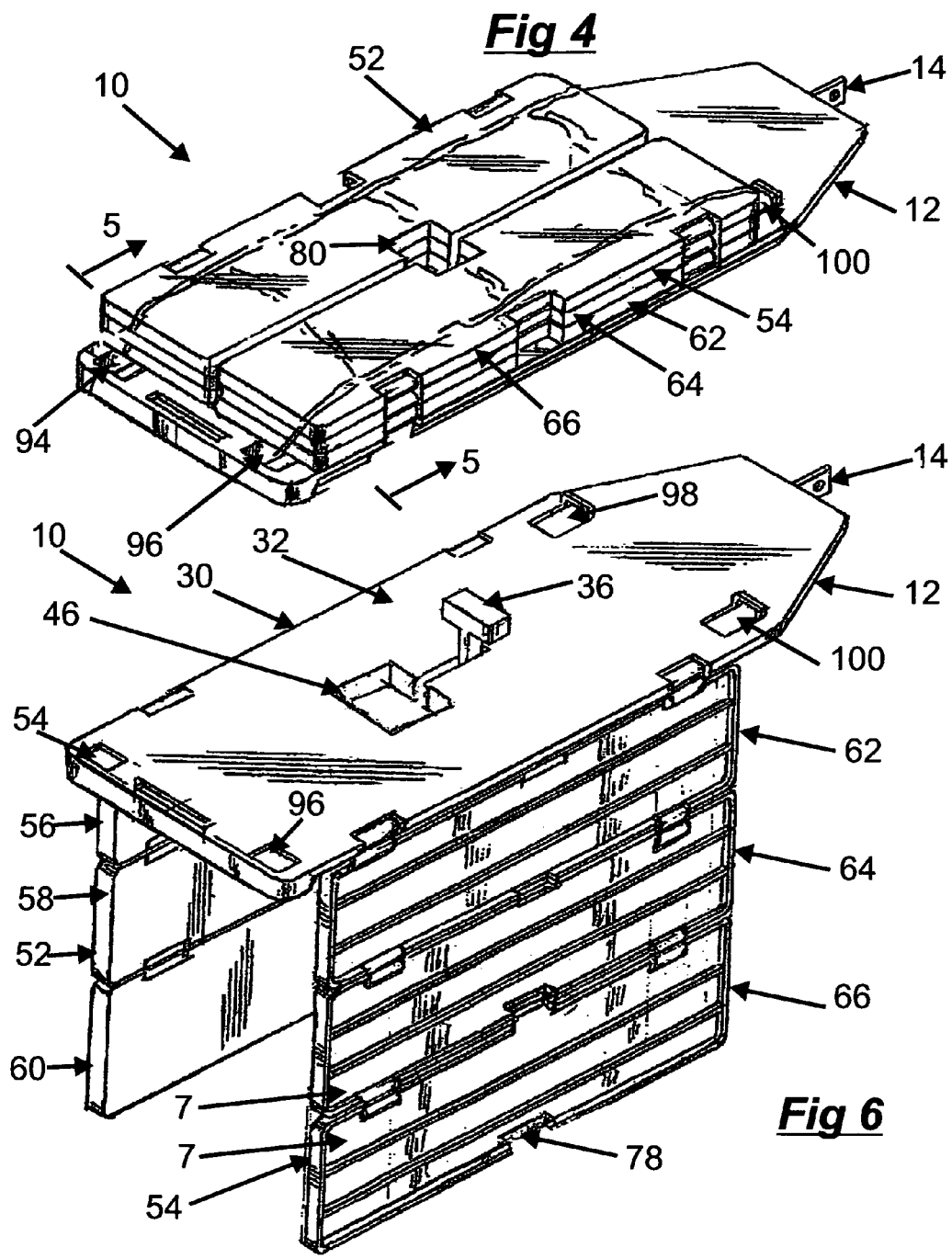

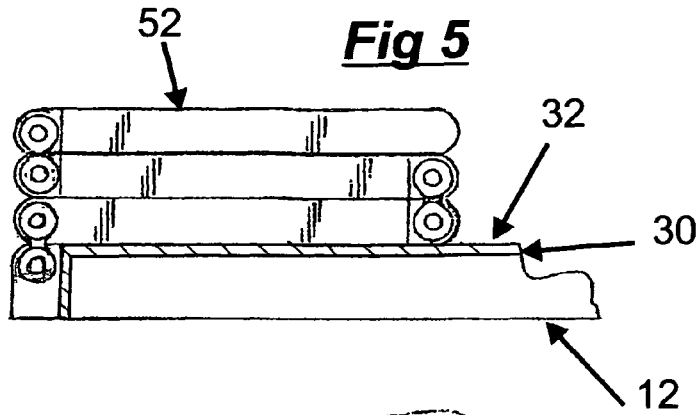
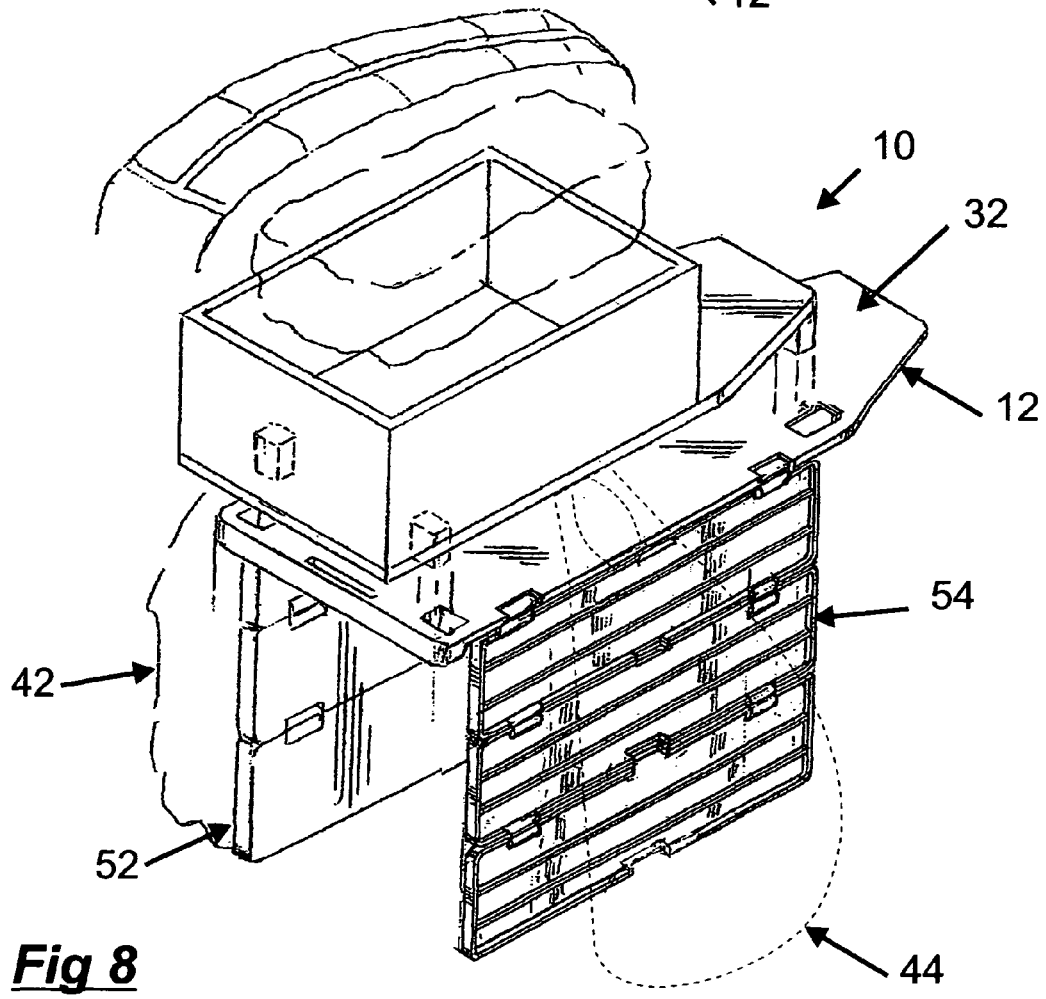

REAR-MOUNTED BIKE RACK FOR SUPPORTING GROCERY BAGS AND SIMILAR ITEMS

BACKGROUND OF THE INVENTION

In the United States bicycles have always been used for transportation by a fraction of the population. Their use is increasing in some locations as a convenient means of transportation. Bicycles are used for many local activities such as going to the store for shopping.

Many devices are known for attachment to the bicycle for transportation of cargo. There are child seats, usually mounted over the rear wheel, for accommodating an infant or small child as a passenger. Saddle bags can be attached over the rear fender. Saddle bags have also been positioned on both sides of the front wheel. They are mostly used by bicycling tourists. Hard-shell storage compartments can be mounted over and/or on the sides of the bicycle at the rear wheel. A basket can be attached to the handlebars. These are all useful for various purposes.

The devices for permitting the transportation of cargo on a bicycle are not well-suited to carry the results of grocery shopping. Modern-day grocery stores bag groceries in sheet polymer bags which have handles formed by punching out a hand-hold near the open top of the bag. The load in the bag can be of various different shapes, depending upon the grocery product. If one bag is not strong enough to be carried by the handle, the goods are usually double-bagged to secure the bagged grocery products. These grocery bags carry the grocery products sold by the store. There is need for a rear-mounted bicycle rack for carrying grocery bags and similar items.

SUMMARY OF THE INVENTION

In order to aid in the understanding of this invention, it can be stated in essentially summary form that it is directed to a rear-mounted rack for mounting on a bicycle for supporting grocery bags and similar items. The bicycle rack has arms and clamps by which it is mounted on the bicycle. It has a platform on which is mounted a generally-upright post upon which the handles of grocery bags can be engaged. The platform has skirts on the side, which depend from the post and platform, which hold the grocery bags away from the rear wheel. When not carrying bags, the skirts can be folded up to be out of the way. By means of this structure, a plurality of grocery bags or the like can be carried on the rear of the bicycle.

It is thus a purpose and advantage of this invention to provide a rack, which can be mounted over the rear wheel of the bicycle which is configured for supporting grocery bags and similar items.

It is a further purpose and advantage of this invention to provide a rear-mounted bike rack which has a generally-upright post upon which the handles of grocery bags can be engaged.

It is another purpose and advantage of this invention to provide a rear-mounted bike rack which has a skirt on each side to hold grocery bags supported thereon away from the rear wheel of the bicycle.

It is a further purpose and advantage of this invention to configure the rack so that, when carrying bags, the skirts protect the bags from engagement on the rear wheel and, when not carrying bags, the skirts can be folded up to be out of the way.

It is a further purpose and advantage of this invention to provide a carrier box which can be removably attached to the rack platform with the carrier box configured to engage on the platform both when the skirts are folded and when the skirts are deployed.

It is another purpose and advantage of this invention to provide a rear-mounted bike rack which is configured for supporting grocery bags and similar items, which can be economically provided so as to enhance the convenience of using a bicycle for grocery shopping.

The features of this invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a side elevational view of a bicycle, with parts broken away, with a rear-mounted bike rack for supporting grocery bags and similar items mounted thereon.

FIG. 2 is an enlarged rear elevational view, as seen generally along the line 2-2 of FIG. 1, with parts broken away. With the skirts folded into the stored position.

FIG. 3 is an enlarged section taken generally along line 3-3 of FIG. 1.

FIG. 4 is a perspective view of the bicycle rack with the skirts folded into the stored position and the supports broken away.

FIG. 5 is an enlarged section taken generally along the line 5-5 of FIG. 4, with parts broken away.

FIG. 6 is a view similar to FIG. 4, with the skirts in the deployed position.

FIG. 8 is a view similar to FIG. 6, on a somewhat reduced scale, showing the carrier box in exploded position, together with a load and netting in dashed lines.

DESCRIPTION OF THE PREFERRED EMBODIMENT

Figure 7:
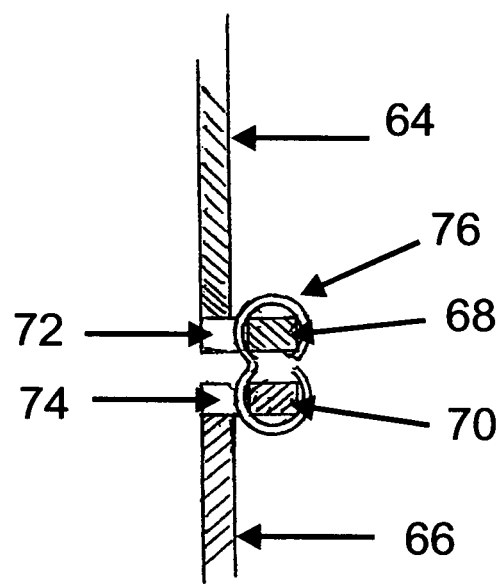
FIG. 7 is an enlarged section taken generally along line 7-7 of FIG. 6, with parts broken away.

The rear-mounted bike rack for supporting grocery bags and similar items of this invention is generally indicated at 10 in FIGS. 1, 4, 6 and 8. The bike rack has a platform 12 for mounting on the bicycle above its rear wheel in the usual way. The platform 12 has a tongue 14 on its front end. The tongue is engaged by two halves of a clamp 16 which embrace the bicycle seat post. At its rear, the bicycle rack is supported by means of left and right struts 18 and 20, which are seen in FIG. 2. At their lower end, the struts are mounted on or near the rear axle of the bicycle, as is seen in FIG. 1, and which is common for such struts. The two struts are strengthened by cross brace 22 which receives the upper end of the left and right struts. The cross brace is long enough in the direction of strut length as to provide significant structural rigidity. Left and right support legs 24 and 26 extend upward from the cross brace 22. These legs are pivotally engaged in the rear outer corners of the platform 12. Pin 28 engages through the rear flange of the platform and through the support leg 24, see FIG. 2. This provides for proper angular support.

The platform 12 has a top panel 30 which has the top surface 32. The top panel has flanges extending downward from the side edges. The left flange is seen in FIG. 2. The flanges extend all the way around the panel to provide strength to the top panel. The pin 28 is engaged through this flange. The platform 12 is thus supported with respect to the bicycle over the rear wheel thereof.

The purpose of the bicycle rack 10 is to permit the bicyclist to ride his bicycle to the grocery store and bring back groceries in bags. Grocery store bags are made of polymer film and are provided with handles. In order to permit the bags to be carried on the bicycle rack 10, T-bar 36 is provided, see FIGS. 3 and 6. T-bar 36 has a shank 38 and a cross bar 40. It is mounted on the bicycle rack to extend upward therefrom to be engaged by the handles of polymer grocery bags 42 and 44 are shown in dashed lines in FIG. 3. It is not necessary that the T-bar be extended to the upper position at all times. When groceries are not being carried, it can be folded down to a recess 46 in the lateral center of the platform 12, see FIG. 6. FIG. 3 shows pocket 48 in which the shank 38 is mounted, and pivot pin 50 which is engaged through the pocket and the shank 38. The T-bar 36 is shown in its raised position in FIGS. 3 and 6. When in its lowered position, it completely lies in the recess 46.

Another necessity when carrying grocery bags on a bicycle is to keep them out of engagement with the rear wheel. To accomplish this, left and right skirts 52 and 54 are provided. In FIGS. 2 and 4, the skirts are shown in their folded, storage position and, in FIGS. 6 and 8, they are shown in their unfolded, deployed position. Each of the skirts is formed of three identical panels. The panels in the left and right skirt are identical also. The left skirt is formed of panels 56, 58 and 60, which are shown in their folded position in FIG. 5 and in their deployed position in FIG. 6. The right skirt 54 is formed of panels 62, 64 and 66. Each of the panels has a flat surface and has flanges extending downward from the surface around the edges thereof to enhance strength. Additionally, as seen in FIG. 6, each panel has two longitudinal intermediate flanges extending downward to increase strength.

Hinging the panels together is accomplished by hinges which are illustrated in FIG. 7. The down-turned edge flanges 68 and 70 are shown in FIG. 7. At the hinges, slots 72 and 74 are formed so that the portions of the edge flange are left as hinge pins over a short portion of the flange. Hinge 76, preferably made of metal, is formed in a figure-eight shape so that it can be closed into the figure-eight shape after it is installed, as shown. This hinge permits the panels to move between the stored position and the deployed position because of the freedom of the hinges to permit swinging in either direction. For example, the swinging hinges permit this freedom as the panel 62 is folded in the counterclockwise direction with respect to panel 64. With these hinges, the panels can be folded back and forth between the deployed and the stored positions.

When in the stored position shown in FIG. 4, the edge notches 78 and the edge flange of each of the panels line up to form a pocket 80, see FIG. 4, which is sized to permit the T-bar to stand out if desired. Normally when the panels are in their stored position, shown in FIG. 4, the T-bar is in the down position. When the panels are in the deployed position and the T-bar 36 is up, the bags 42 and 44 can be engaged over the T-bar for carrying on the bicycle rack.

As an additional utility for the bicycle rack, carrier 82 is also provided, see FIG. 8. Carrier 82 has a bottom floor 84 on which are mounted walls to define an open-top box. Left and right walls 86 and 88 and front and back walls 90 and 92 define the open top box portion of the carrier. Platform 12 has sockets 94, 96, 98 and 100, see FIG. 6. The bottom of bottom floor 84 has corresponding legs. Legs 102 and 104 are shown in dashed lines in FIG. 8. They are sized to fit into sockets 94 and 96. Leg 106 is also seen in FIG. 8, and it is sized and configured to fit into socket 100. A corresponding leg fits into the socket 98.

In FIG. 8, the carrier 82 is shown in projected position with respect to the top surface 32 of the platform. When the side panels are deployed, as shown in FIGS. 6 and 8, the carrier fits directly onto the platform. When the side panels are in their stored condition, shown in FIG. 4, it is seen that the sockets are exposed. The legs are sufficiently long so that the carrier can be placed over the stored panels and the legs engage into the sockets. In this way, the carrier can be carried on the platform with the panels in their stored position. FIG. 8 shows a package 108 in dashed lines which can be held in place by means of a netting 110. The netting is elastic or has elastic connections. The netting has connections configured to engage under the flanges on the edges of the platform to resiliently hold the netting, package and carrier in place. If desired, the netting can be used without the carrier 82, but simply engage over the folded panels to hold the skirts in place in their folded position. In this way, great versatility is achieved.

This invention has been described in its presently contemplated best modes and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A rack for mounting on a bicycle, comprising:
   a platform, said platform having a top surface, a recess, and structure for removably mounting said platform with respect to the frame of a bicycle;
   a post mounted in the recess and movable between an extended operative position in which at least a part of the post extends upwardly through the recess and above the top surface of the platform and a retracted position wherein the post is below the top surface of the platform;
   left and right skirts mounted on said platform, said skirts being positionable in a deployed position to inhibit bags engaged on said post from engaging the rear wheel of the bicycle, said skirts being mounted on said platform so that they can be carried on said platform in a stored position.

2. The bicycle rack of claim 1 wherein there is pivot structure on said platform, said left and right skirts being mounted on said pivot structure so that said skirts can move from a deployed position when they extend downward from said platform to a storage position where they can be stored on said top surface of said platform.

3. The bicycle rack of claim 2 wherein said pivot structure comprises slots formed in the edges of said platform and said skirts to define pivot pins and a hinge structure engaging said pivot pins.

4. The bicycle rack of claim 3 wherein said hinge structure comprises a figure eight structure engaging both of said pivot pins.

5. The bicycle rack of claim 1 wherein each of said left and right skirts is formed of at least first and second panels, said first panel being hinged to said platform and said second panel being hinged to said first panel.

6. The bicycle rack of claim 5 wherein said platform and said panels each have edge flanges and each have a slot formed adjacent said flange to define hinge pins and there is hinge structure engaging said pins to permit hinging of second panel on said first panel and said first panel upon said platform.

7. The bicycle rack of claim 6 wherein said hinged structure comprises a figure eight structure engaging pairs of said hinge pins.

8. A bicycle rack comprising:
   a platform for mounting over the rear wheel of a bicycle, said platform having left and right edges;
   left and right skirts being respectively pivoted on the left and right edges of said platform, said left and right skirts having a deployed position wherein they depend downward from said platform and a storage position where they lie on the top of said platform;
   attachment structure on said platform so that bags can be engaged on said attachment structure and said bags are protected against engagement with the rear wheel of the bicycle by means of said left and right skirts when they are in a deployed position; and
   a carrier for releasable mounting on the platform by means of legs and sockets, the carrier being mountable on the platform when the left and right skirts are in the deployed position and the storage position.

9. The bicycle rack of claim 8 wherein said first and second skirts are each pivotally mounted on said platform so that they can be pivoted from a depending, deployed position to a stored position wherein they lie on said platform.

10. The bicycle rack of claim 9 wherein said left and right skirts each is comprised of at least first and second skirt panels, said first and second skirt panels being hinged with respect to each other and said first skirt panel being hinged with respect to said platform.

11. The bicycle rack of claim 10 wherein said hinges between said first and second panels comprise hinge pins formed on said panels and hinged structure engaging said hinge pins.

12. The bicycle rack of claim 8 wherein the carrier has sockets and legs so that when said sockets and legs are interengaged, said carrier is removably mounted on said platform.

13. The bicycle rack of claim 12 wherein said sockets and legs are configured so that they can interengage when said skirts are in folded position, on top of said platform.

14. The bicycle rack of claim 8 wherein said left and right skirts are each comprised of first and second panels, said first panel being hinged with respect to said platform and said second panel being hinged with respect to said first panel so that said panels can be moved with respect to each other and with respect to said platform to lie on top of said platform in stacked position.

15. The bicycle rack of claim 14 wherein said hinges are formed by slots at the edges of said platform and said panels so that said slots define hinge pins and there is a hinge member interengaging said hinge pins to permit hinging between said panels.

16. The bicycle rack of claim 8 wherein said carrier structure is a boxlike structure.

17. The bicycle rack of claim 8 wherein the attachment structure comprises an upright post on said platform which extends above said platform so that grocery bags can be engaged thereon for carrying on said bicycle rack.

18. The bicycle rack of claim 17 wherein said upright post is pivoted on said platform so that it can be moved from a raised position in which it extends above said platform to a stored position wherein it lies below the top of said platform.

19. A bicycle rack comprising:
   a platform for mounting over the rear wheel of a bicycle, said platform having left and right edges;
   at least one of left and right skirts being respectively pivoted on the left and right edges of said platform, said left and right skirts having a deployed position wherein they depend downward from said platform and a storage position where they lie on the top of said platform;
   attachment structure on said platform so that bags can be engaged on said attachment structure and said bags are protected against engagement with the rear wheel of the bicycle by means of said left and right skirts when they are in a deployed position; and
   a carrier for releasable mounting on the platform in both the deployed and storage position by means of legs and sockets.

* * * * *